US009714829B2

(12) United States Patent
Ohno et al.

(10) Patent No.: US 9,714,829 B2
(45) Date of Patent: Jul. 25, 2017

(54) INFORMATION PROCESSING APPARATUS, ASSEMBLY APPARATUS, INFORMATION PROCESSING METHOD, AND STORAGE MEDIUM THAT GENERATE A MEASUREMENT PATTERN HAVING DIFFERENT AMOUNTS OF IRRADIATION LIGHT DEPENDING ON IMAGING REGIONS

(71) Applicant: CANON KABUSHIKI KAISHA, Tokyo (JP)

(72) Inventors: Akira Ohno, Tokyo (JP); Takahisa Yamamoto, Kawasaki (JP); Masakazu Matsugu, Yokohama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 308 days.

(21) Appl. No.: 14/310,349

(22) Filed: Jun. 20, 2014

(65) Prior Publication Data
US 2015/0003685 A1 Jan. 1, 2015

(30) Foreign Application Priority Data
Jun. 26, 2013 (JP) ................ 2013-134202

(51) Int. Cl.
*G01C 3/08* (2006.01)
*G06T 7/521* (2017.01)

(52) U.S. Cl.
CPC ............. *G01C 3/08* (2013.01); *G06T 7/521* (2017.01); *Y10S 901/47* (2013.01)

(58) Field of Classification Search
None
See application file for complete search history.

(56) References Cited

U.S. PATENT DOCUMENTS 4,905,034 A  2/1990 Tejima et al.
6,658,170 B1 12/2003 Nakatani et al.
(Continued)

FOREIGN PATENT DOCUMENTS

JP  2000-241131 A  9/2000
JP  2006-003212 A  1/2006
(Continued)

OTHER PUBLICATIONS

Tsai, Roger Y. "A Versatile Camera Calibration Technique for High-Accuracy 3D Machine Vision Metrology Using Off-the-Shelf TV Cameras and Lenses," IEEE Journal of Robotics and Automation, vol. RA-3, No. 4, Aug. 1987, pp. 323-344.
(Continued)

*Primary Examiner* — Sumati Lefkowitz
*Assistant Examiner* — Jiangeng Sun
(74) *Attorney, Agent, or Firm* — Fitzpatrick, Cella, Harper & Scinto

(57) ABSTRACT

An information processing apparatus includes an irradiation unit to irradiate a measurement target with a measurement pattern for distance measurement. An imaging unit obtains a captured image including the irradiated measurement target. A first detection unit detects first and second regions from the captured image. The first region includes a first portion of the measurement target that reflects a greater amount of light toward the imaging unit. The second region includes a second portion of the measurement target that reflects a lesser amount of light toward the imaging unit. A second detection unit detects, from the measurement pattern, a first region with which the first portion is irradiated and a second region with which the second portion is irradiated. A generation unit generates a measurement pattern that has different amounts of irradiation light depending on regions.

(Continued)

A distance to the measurement target is derived using an obtained captured image.

19 Claims, 8 Drawing Sheets

(56) References Cited

U.S. PATENT DOCUMENTS

| | | | |
|---|---|---|---|
| 6,876,392 B1 | 4/2005 | Uomori et al. | |
| 7,031,535 B2 | 4/2006 | Yamamoto | |
| 7,092,563 B2 | 8/2006 | Shiratani | |
| 7,239,347 B2 | 7/2007 | Yamamoto et al. | |
| 7,388,679 B2* | 6/2008 | Yoshino | G01B 11/2527 356/603 |
| 7,432,909 B2 | 10/2008 | Yamamoto et al. | |
| 7,522,195 B2 | 4/2009 | Yamamoto et al. | |
| 7,587,094 B2 | 9/2009 | Fujiwara et al. | |
| 8,082,573 B2 | 12/2011 | Miyamoto et al. | |
| 8,320,696 B2* | 11/2012 | Yamamoto | G06T 5/20 382/166 |
| 8,970,853 B2* | 3/2015 | Takabayashi | G01B 11/25 356/610 |
| 9,046,364 B2* | 6/2015 | Kojo | G01S 11/12 |
| 2014/0196544 A1* | 7/2014 | Wanda | A61B 5/14542 73/655 |
| 2014/0285541 A1* | 9/2014 | Seo | G09G 5/10 345/691 |
| 2015/0012244 A1* | 1/2015 | Oki | G01S 17/32 702/159 |

FOREIGN PATENT DOCUMENTS

| | | |
|---|---|---|
| JP | 3884321 B2 | 2/2007 |
| JP | 4077754 B2 | 4/2008 |

OTHER PUBLICATIONS

Kimura, Makoto, et al. "Projector Calibration using Arbitrary Planes and Calibrated Camera," IEEE, 2007.

Tsai, "A Versatile Camera Calibration Technique for High-Accuracy 3D Machine Vision Metrology Using Off-the-Shelf TV Cameras and Lenses," IEEE Journal of Robotics and Automation, vol. RA-3, No. 4, Aug. 1987, pp. 323-344.

Kimura, et al., "Projector Calibration using Arbitrary Planes and Calibrated Camera," IEEE, 2007.

Japanese Official Action dated Jan. 30, 2017, issued in corresponding Japanese Patent Application No. 2013-134202.

* cited by examiner

F I G. 4

| NO. | AVERAGE VALUE OF LUMINANCE UNDER AMBIENT LIGHT ONLY (OR UNIFORM IRRADIATION) | AVERAGE VALUE OF LUMINANCE UNDER IRRADIATION | IRRADIATION PATTERN INTENSITY |
|---|---|---|---|
| 1 | DEFAULT | DEFAULT | IRRADIATION PATTERN INTENSITY D |
| 2 | 80 < LUMINANCE ≤ 90 | 240 < LUMINANCE ≤ 255(SATURATED) | IRRADIATION PATTERN INTENSITY 1 |
| 3 | 40 < LUMINANCE ≤ 50 | 210 < LUMINANCE ≤ 255(SATURATED) | IRRADIATION PATTERN INTENSITY 2 |
| 4 | 110 < LUMINANCE ≤ 130 | 205 < LUMINANCE ≤ 220 | IRRADIATION PATTERN INTENSITY 3 |

FIG. 5A

| AVERAGE VALUE OF LUMINANCE UNDER AMBIENT LIGHT ONLY (OR UNIFORM IRRADIATION) | AVERAGE VALUE OF LUMINANCE UNDER IRRADIATION | ATTRIBUTE |
|---|---|---|
| DEFAULT | DEFAULT | ASSEMBLY UNIT |
| 80 < LUMINANCE ≤ 90 | 240 < LUMINANCE ≤ 250 | GRIPPED PART 1 |
| 40 < LUMINANCE ≤ 50 | 210 < LUMINANCE ≤ 240 | GRIPPED PART 2 |
| 110 < LUMINANCE ≤ 130 | 205 < LUMINANCE ≤ 220 | GRIPPED PART 3 |

FIG. 5B

| ATTRIBUTE | DISTANCE BETWEEN ASSEMBLY TARGET AND IRRADIATION UNIT | | | |
|---|---|---|---|---|
|  | 0 < L ≤ 50mm | 50 < L ≤ 100mm | 100 < L ≤ 150mm | ... |
| GRIPPED PART 1 | IRRADIATION PATTERN INTENSITY 1 | SAME AS LEFT | SAME AS LEFT | ... |
| GRIPPED PART 2 | IRRADIATION PATTERN INTENSITY 2 | SAME AS LEFT | SAME AS LEFT | ... |
| GRIPPED PART 3 | IRRADIATION PATTERN INTENSITY 3 | SAME AS LEFT | SAME AS LEFT | ... |
| ASSEMBLY UNIT | IRRADIATION PATTERN INTENSITY 4 | IRRADIATION PATTERN INTENSITY 5 | IRRADIATION PATTERN INTENSITY 6 | ... |

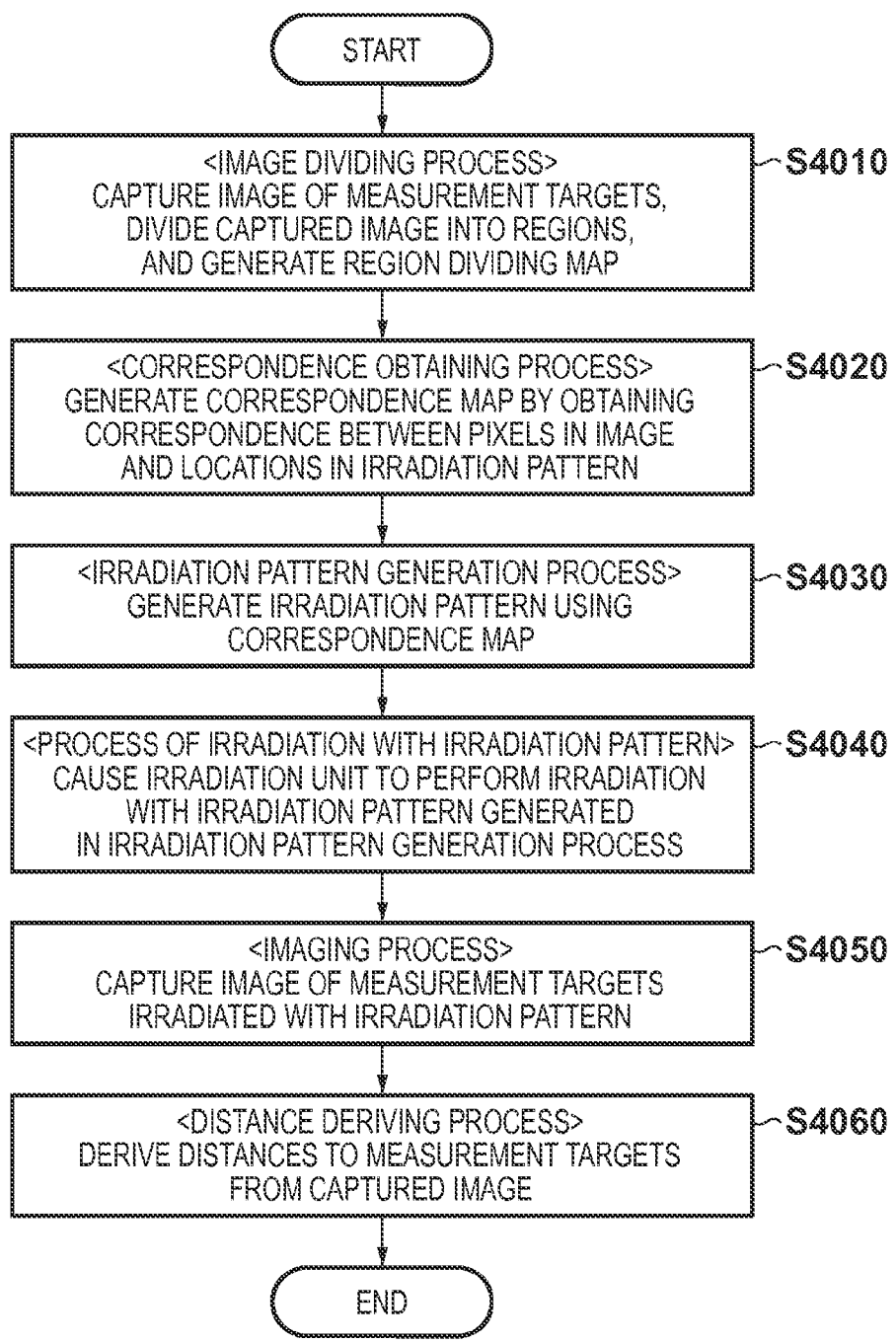

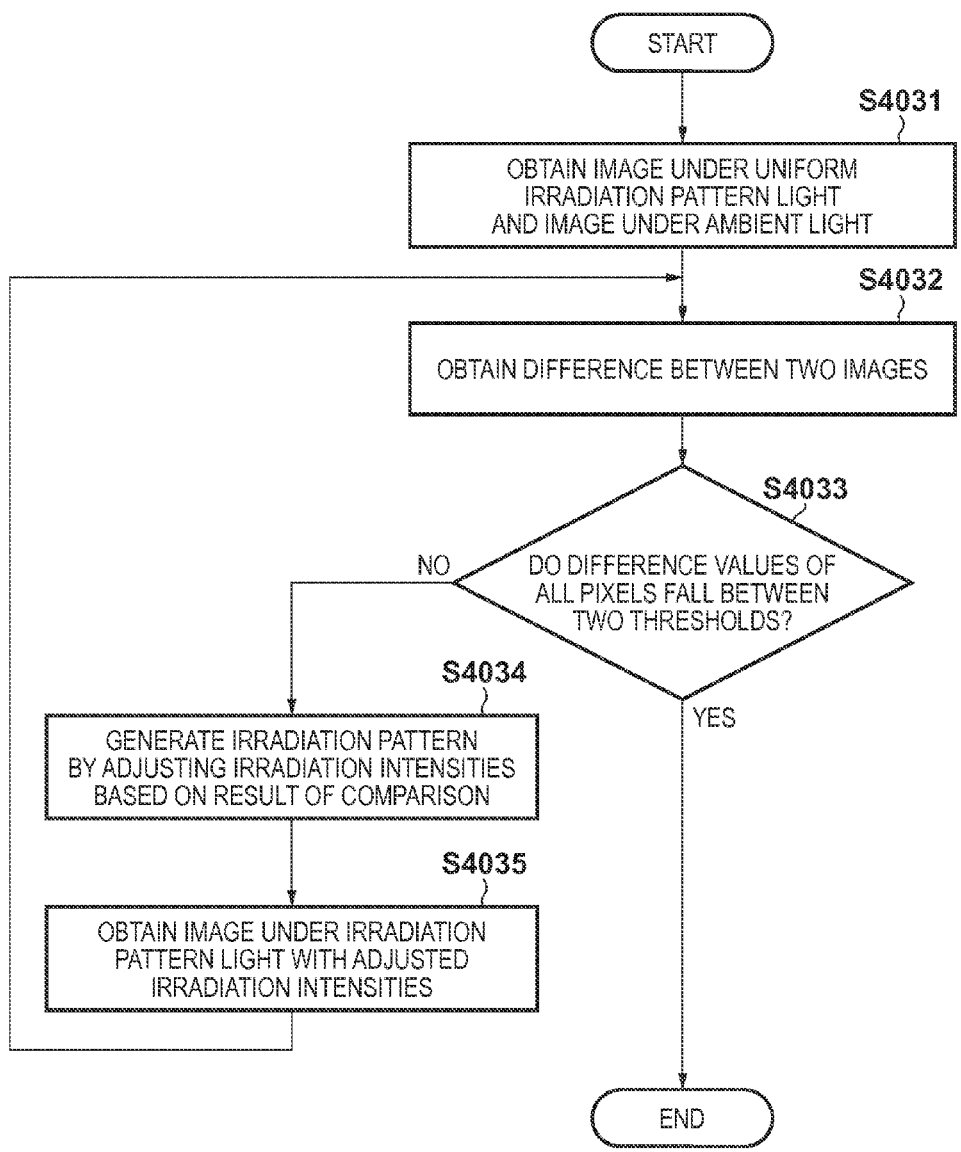

INFORMATION PROCESSING APPARATUS, ASSEMBLY APPARATUS, INFORMATION PROCESSING METHOD, AND STORAGE MEDIUM THAT GENERATE A MEASUREMENT PATTERN HAVING DIFFERENT AMOUNTS OF IRRADIATION LIGHT DEPENDING ON IMAGING REGIONS

CLAIM OF PRIORITY

This application claims the benefit of Japanese Patent Application No. 2013-134202, filed Jun. 26, 2013, which is hereby incorporated by reference herein in its entirety.

BACKGROUND OF THE INVENTION

Field of the Invention

The present invention relates to an information processing apparatus, a control apparatus, an assembly apparatus, an information processing method, and a storage medium.

Description of the Related Art

As a method of measuring a distance to an object, an active measurement method is known that captures an image of the object while the object is irradiated with slit light, two-dimensional pattern light, and the like, and measures the distance based on the principle of triangulation. Japanese Patent No. 4077754 discloses a measurement apparatus that can perform irradiation with an irradiation pattern from multiple directions. According to a method of Japanese Patent No. 4077754, even if the luminance of an image is saturated when irradiation is performed with the irradiation pattern from a predetermined direction, irradiation can be performed with the irradiation pattern from another direction, so that a distance is measured based on an image with sufficient contrast.

Japanese Patent No. 3884321 discloses a method of measuring a distance to an object while correcting the influence of the surface reflectance of the object and external light using an image of the object that is irradiated with a light source, an image of the object that is not irradiated with the light source, and an image of the object that is irradiated with pattern light.

SUMMARY OF THE INVENTION

According to an embodiment of the invention, an information processing apparatus comprises an irradiation unit configured to irradiate a measurement target with a measurement pattern for distance measurement, an imaging unit configured to obtain a captured image including the measurement target irradiated with the measurement pattern, a first detection unit configured to detect a first region and a second region from the captured image obtained by the imaging unit, the first region including a first portion of the measurement target that reflects a greater amount of light toward the imaging unit, and the second region including a second portion of the measurement target that reflects a lesser amount of light toward the imaging unit than the first portion does, a second detection unit that detects, from the measurement pattern, a first region with which the first portion is irradiated and a second region with which the second portion is irradiated, a generation unit configured to generate a measurement pattern that has different amounts of irradiation light depending on regions, such that an amount of irradiation light in the first region is less than an amount of irradiation light in the second region, an instruction unit configured to cause the irradiation unit to perform irradiation with the generated measurement pattern, and a deriving unit configured to obtain, from the imaging unit, a captured image including the measurement target irradiated with the generated measurement pattern, and to derive a distance to the measurement target using the obtained captured image.

According to another embodiment of the invention, an information processing method comprises irradiating a measurement target with a measurement pattern for distance measurement, obtaining a captured image including the measurement target irradiated with the measurement pattern, detecting a first region and a second region from the captured image, the first region including a first portion of the measurement target that reflects a greater amount of light, and the second region including a second portion of the measurement target that reflects a lesser amount of light than the first portion does, detecting, from the measurement pattern, a first region with which the first portion is irradiated and a second region with which the second portion is irradiated, generating a measurement pattern that has different amounts of irradiation light depending on regions, such that an amount of irradiation light in the first region is less than an amount of irradiation light in the second region, irradiating a measurement target with the generated measurement pattern, obtaining a captured image including the measurement target irradiated with the generated measurement pattern, and deriving a distance to the measurement target using the obtained captured image.

According to still another embodiment of the invention, a non-transitory computer-readable medium stores a program to cause a computer to instruct an irradiation unit to irradiate a measurement target with a measurement pattern for distance measurement, to obtain a captured image including the measurement target irradiated with the measurement pattern, to detect a first region and a second region from the captured image, the first region including a first portion of the measurement target that reflects a greater amount of light, and the second region including a second portion of the measurement target that reflects a lesser amount of light than the first portion does, to detect, from the measurement pattern, a first region with which the first portion is irradiated and a second region with which the second portion is irradiated, to generate a measurement pattern that has different amounts of irradiation light depending on regions, such that an amount of irradiation light in the first region is less than an amount of irradiation light in the second region to instruct the irradiation unit to irradiate a measurement target with the generated measurement pattern to obtain a captured image including the measurement target irradiated with the generated measurement pattern, and to derive a distance to the measurement target using the obtained captured image.

Further features of the present invention will become apparent from the following description of exemplary embodiments (with reference to the attached drawings).

BRIEF DESCRIPTION OF THE DRAWINGS

FIG. 4 shows an example of the correspondence between image luminances and irradiation intensities that is referred to in the first embodiment.

FIGS. 5A and 5B show examples of the correspondence between image luminances and irradiation intensities that is referred to in a second embodiment.

FIG. 7 is a flowchart showing an example of processing according to the fourth embodiment.

FIG. 8 is a flowchart showing an example of processing according to the fourth embodiment.

DESCRIPTION OF THE EMBODIMENTS

In some cases, a distance is difficult to measure due to the property of a measurement target object. For example, there is a case when a measurement target object includes both high-reflectance material, such as white or metallic material, and black, low-reflectance material. In this case, the intensity of light reflected by the high-reflectance material is high, whereas the intensity of light reflected by the low-reflectance material is low. Therefore, if irradiation is performed with an irradiation pattern using a conventional method, there is a possibility that the intensity values are saturated in a portion of a captured image corresponding to the high-reflectance material, or the intensity values are insufficient in a portion of the captured image corresponding to the low-reflectance material. This results in variations in detected locations of the irradiation pattern or a failure to detect the irradiation pattern, and, therefore, accurate distance measurement may not be able to be performed simultaneously for both of the high-reflectance material and the low-reflectance material.

A similar problem could possibly occur in the case when a measurement target object includes a portion close to an irradiation apparatus and a portion far from the irradiation apparatus. Furthermore, a similar problem could possibly occur in a case when a measurement target object includes portions of different colors. For example, in a case when a measurement target object includes a red portion and a blue portion, the intensity of reflected light from the blue portion is low when the measurement target object is irradiated with a red irradiation pattern, whereas the intensity of reflected light from the red portion is low when the measurement target object is irradiated with a blue irradiation pattern.

Meanwhile, complicated tasks that have conventionally been performed by humans, such as assembly of industrial products, are more frequently performed by robots. A robot grips a part using an end effector such as a hand, moves the gripped part to an assembly target, and installs the gripped part on the assembly target. In order for a robotic hand and the like to install the gripped part on the assembly target, the robot needs to be taught about the accurate positional relationship between the gripped part and the assembly target. In a case when the active measurement method is used in obtaining such a positional relationship, while it is necessary to irradiate both of the gripped part and the assembly target with irradiation light, accurate distance measurement may not be able to be performed simultaneously for two measurement targets, as mentioned earlier.

According to one embodiment of the present invention, more accurate distance measurement can be performed simultaneously for a plurality of portions composing a target of distance measurement.

First Embodiment

Figure 1:
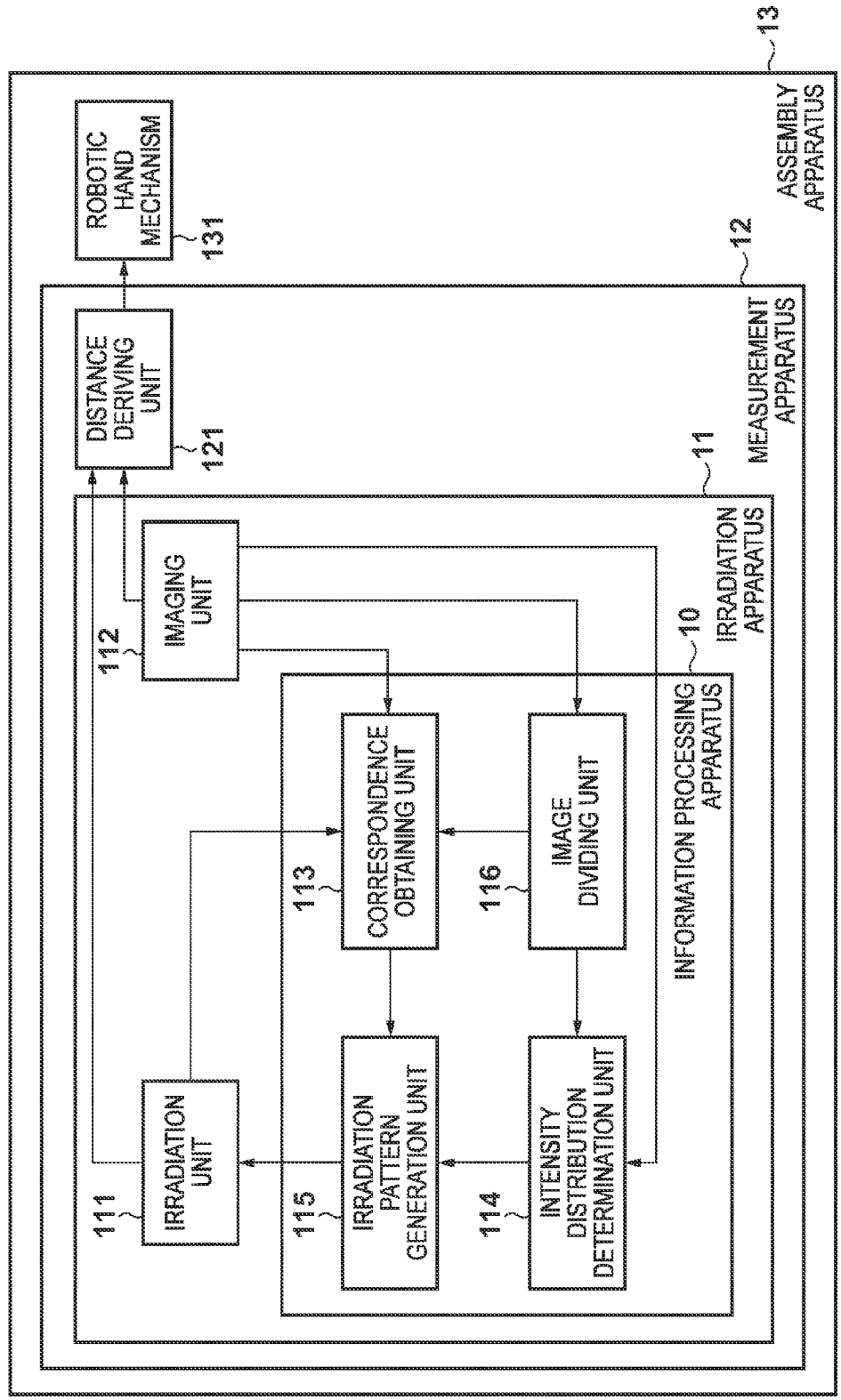
FIG. 1 shows an example of a configuration of an assembly apparatus according to a first embodiment.

The following describes a first embodiment of the present invention. As shown in FIG. 1, an assembly apparatus 13 according to the present embodiment includes a measurement apparatus 12 and a robotic hand mechanism 131 (a gripping apparatus). The robotic hand mechanism 131 includes a robotic hand and a control apparatus that controls the robotic hand. The control apparatus of the robotic hand mechanism 131 controls the robotic hand to install an object gripped by the robotic hand (a gripped part) on an assembly target object with reference to distance information obtained from the measurement apparatus 12. The measurement apparatus 12 provides the robotic hand mechanism 131 with distance information of the gripped part or the assembly target (hereafter referred to as measurement targets). That is to say, the gripped part and the assembly target constitute the measurement targets.

The measurement apparatus 12 includes an irradiation apparatus 11 and a distance deriving unit 121. The irradiation apparatus 11 irradiates the measurement targets with an irradiation pattern for distance measurement (a measurement pattern). For example, a stripe pattern used in known spatial coding methods can be used as the measurement pattern according to the present embodiment. The distance deriving unit 121 determines distances to points on surfaces of the measurement targets relative to the location of the irradiation apparatus 11 based on information of the irradiation pattern with which the irradiation apparatus 11 performed irradiation and on obtained image information. More precisely, the distance deriving unit 121 determines distances relative to the location of a later-described irradiation unit 111 or imaging unit 112. For example, the measurement apparatus 12 can determine a distance to the gripped part or to the assembly target. It should be noted that the measurement apparatus 12 need not include the irradiation unit 111 and the imaging unit 112. The measurement apparatus 12 may include an information processing apparatus 10 and the distance deriving unit 121, and may be connected to the irradiation unit 111 and the imaging unit 112 such that it can perform communication therewith.

A conventional method can be used as a method of deriving a distance. In the present embodiment, it is assumed that a distance is measured using the principle of triangulation. Triangulation is performed on the basis of a triangle that has the following points as vertices: the irradiation unit 111 and the imaging unit 112, which are included in the irradiation apparatus 11 (to be exact, light spots of the irradiation unit 111 and the imaging unit 112), and one point on the measurement targets. More specifically, using a line segment connecting the irradiation unit 111 and the imaging unit 112 as a baseline, angles formed by the baseline and a point on the measurement targets are obtained. The angles are obtained with reference to the correspondence between the irradiation pattern with which the irradiation unit 111 performed irradiation and an image captured by the imaging unit 112. By using the length of this baseline and the angles, the distance from the imaging unit 112, that is to say, from the location of the observation point to a point on the measurement targets is derived. In triangulation, calculation is performed based on internal parameters related to the irradiation unit 111 and the imaging unit 112, and on information indicating the relative locations and orientations of the irradiation unit 111 and the imaging unit 112.

The irradiation apparatus 11 includes the information processing apparatus 10, the irradiation unit 111, and the imaging unit 112. The irradiation unit 111 irradiates the measurement targets with an irradiation pattern generated by a later-described irradiation pattern generation unit 115. In the present embodiment, the irradiation unit 111 may perform irradiation while controlling the intensity distribution of the irradiation pattern on a per-color component basis. While the irradiation unit 111 is not limited to any specific configuration, the irradiation unit 111 can be, for example, a liquid crystal projector. The liquid crystal projector can control colors displayed by the irradiation pattern and the intensity of the irradiation pattern on a per-pixel basis. Internal parameters of the liquid crystal projector (for example, the focal length, the location of the principal point, lens distortion, and the like) can be calibrated in advance. Alternatively, the irradiation unit 111 can be, for example, a projector provided with a digital mirror device.

The imaging unit 112 obtains an image of the measurement targets that are irradiated with the irradiation pattern by the irradiation unit 111, or an image of the measurement targets that are not irradiated with the irradiation pattern by the same. While the imaging unit 112 is not limited to any specific configuration, the imaging unit 112 can be, for example, an imaging apparatus provided with an image sensor, such as a digital camera. The irradiation apparatus 11 may include an image obtaining unit (not shown) that reads still images or moving images prestored in a storage apparatus, either in place of or in addition to the imaging unit 112. In this case, images read by the image obtaining unit are input to a later-described correspondence obtaining unit 113 and image dividing unit 116.

The information processing apparatus 10 includes a correspondence obtaining unit 113, an intensity distribution determination unit 114, an irradiation pattern generation unit 115, and an image dividing unit 116. The correspondence obtaining unit 113 obtains the correspondence between locations in the irradiation pattern with which the irradiation unit 111 performed irradiation and pixels in a captured image obtained by the imaging unit 112 (second detection). It should be noted that, as will be described later, this correspondence need not specify individual pixels in the captured image corresponding to respective locations in the irradiation pattern. For example, this correspondence may be information that specifies divided regions of the captured image corresponding to respective locations in the irradiation pattern.

In the following description, it is assumed that locations in the irradiation pattern denote pixels in an irradiation pattern image showing the irradiation pattern. In the present embodiment, a liquid crystal projector is used as the irradiation unit 111, and, therefore, locations in the irradiation pattern denote pixels in a liquid crystal filter provided in the liquid crystal projector. That is to say, in the present embodiment, the correspondence obtaining unit 113 obtains the correspondence between pixels in the liquid crystal filter of the liquid crystal projector and pixels in the image obtained by the imaging unit 112.

The irradiation pattern used in the present embodiment has coded information that allows locations in the irradiation pattern to be specified. As a specific example, the measurement targets are irradiated with a grid pattern in the present embodiment. The correspondence obtaining unit 113 obtains, from the imaging unit 112, an image, while the grid pattern is irradiated. Then, the correspondence obtaining unit 113 extracts the grid pattern from the obtained image, and extracts coded information embedded in grid points. Based on the extracted coded information, the correspondence obtaining unit 113 further finds out the correspondence between portions of the image in which the coded information is embedded and locations in the grid pattern with which irradiation was performed. In this way, the correspondence obtaining unit 113 obtains the correspondence between locations in the irradiation pattern with which the irradiation unit 111 performs irradiation and pixels in the captured image. The correspondence obtaining unit 113 holds corresponding location information that indicates the obtained correspondence.

The irradiation pattern is not limited to the grid pattern. Any irradiation pattern may be used as long as it can associate partial regions of the captured image with locations in the irradiation pattern and enables distance measurement, even when the irradiation intensity is changed on a per-region basis. For example, multi-slit light or spatially-modulated pattern light may be used as the irradiation pattern.

The image dividing unit 116 divides the image obtained from the imaging unit 112 into a plurality of regions based on luminances of the image. In the present embodiment, the image dividing unit 116 divides the image into a region including the part gripped by the robotic hand mechanism 131 and a region including the assembly target on which the gripped part is to be installed (first detection). The image dividing unit 116 holds information indicating locations of the respective regions. It should be noted that the image is not limited to being divided in accordance with the foregoing method, and may be divided into, for example, three or more regions. In this case, the irradiation intensity can be determined for each of the three or more divided regions.

The intensity distribution determination unit 114 determines the intensity distribution of the irradiation pattern with which irradiation is performed for each of the regions divided by the image dividing unit 116. More specifically, the intensity distribution determination unit 114 determines the intensities of respective pixels in the irradiation pattern based on luminances of the image obtained by the imaging unit 112. At this time, the intensity distribution determination unit 114 determines the intensities of the irradiation pattern with reference to information indicating the correspondence between luminances of the image and the intensities of the irradiation pattern. This correspondence is generated in advance, and a method of generating the same will be described later. Hereafter, the intensities of the respective pixels in the irradiation pattern may simply be referred to as "intensities" in a shortened way.

More specifically, the intensities of the irradiation pattern can be pixel values of ON pixels in a case when each of pixels in the irradiation pattern is either ON or OFF. Also, in a case when a multi-value pattern is used as the irradiation pattern, the intensities of the irradiation pattern can be pixel values corresponding to the largest value among multiple values. Furthermore, the intensities of the irradiation pattern can be used in determining the pixel values of the respective pixels in the irradiation pattern in the above-described manner. On the other hand, in a case when an irradiation pattern embedded with coded information is used, the intensities of the irradiation pattern may be determined in correspondence with the coded information and used in determining pixel values of partial regions including the coded information.

The irradiation pattern generation unit 115 generates the irradiation pattern in accordance with the correspondence obtained from the correspondence obtaining unit 113 and the intensity distribution determined by the intensity distribution determination unit 114. The irradiation unit 111 irradiates the measurement targets with light in accordance with the irradiation pattern generated by the irradiation pattern generation unit 115.

Figure 2A:
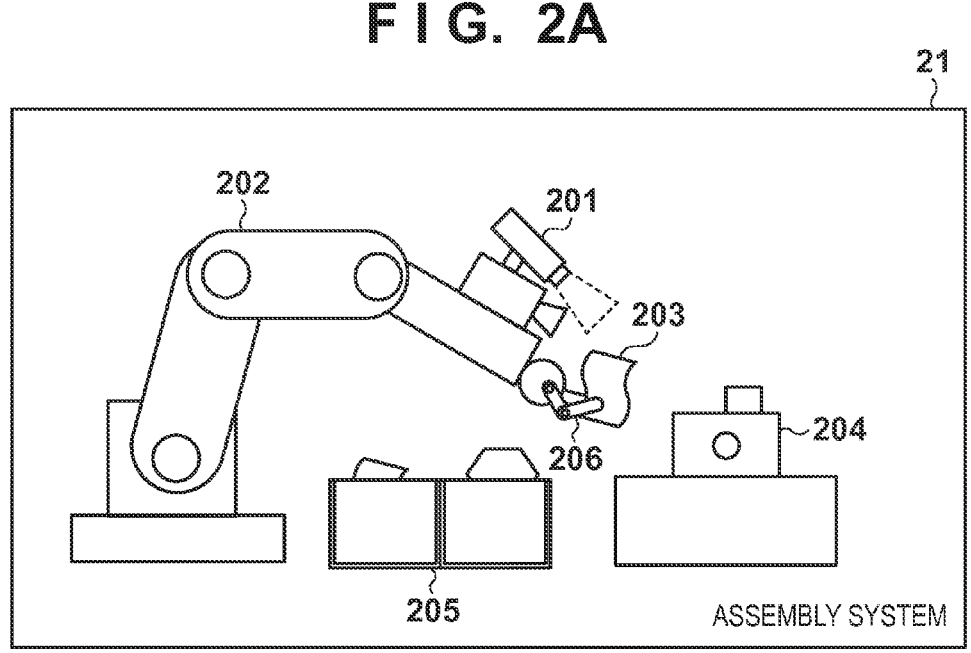
FIGS. 2A and 2B show examples of an assembly system using the assembly apparatus according to the first embodiment.

FIG. 2A schematically shows an assembly system 21 using the assembly apparatus 13. The assembly system 21 allows a gripped part 203 to be installed on an assembly target 204 by controlling a robotic hand 202. An operation method for the assembly system 21 will now be described. First, a gripping unit 206 of the robotic hand 202 moves to be situated above a parts box 205. Next, the gripping unit 206 grips a single gripped part 203 out of the parts box 205. While maintaining the gripped state, the gripping unit 206 moves to the assembly target 204 and installs the gripped part 203 on the assembly target 204. By repeating this operation, a plurality of parts can be installed on one assembly target 204.

The robotic hand 202 includes an on-hand three-dimensional measurement apparatus 201. The on-hand three-dimensional measurement apparatus 201 includes the above-described irradiation unit 111 and imaging unit 112 of the measurement apparatus 12, as well as a mounting unit for the robotic hand 202. In order to monitor the above-described sequence of operations from gripping of a part to installation, distance measurement is performed at an arbitrary timing using the irradiation unit 111, the imaging unit 112, and the information processing apparatus 10 that is connected thereto such that it can perform communication therewith.

Figure 2B:
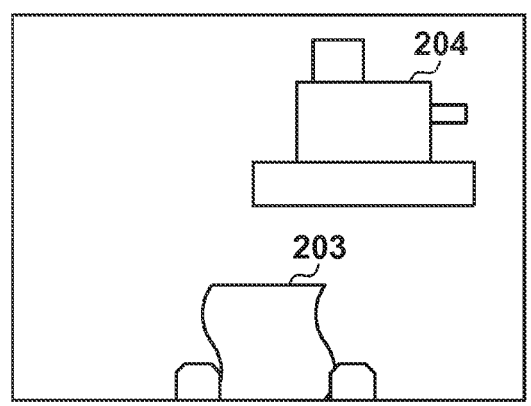

FIG. 2B shows an example of an image captured by the imaging unit 112. The imaging unit 112 captures an image including both of the gripped part 203 (first portion, first object) and the assembly target 204 (second portion, second object). It will be assumed that, in FIG. 2B, the gripped part 203 is a white part and the assembly target 204 is composed mainly of black parts. In FIG. 2B, the distance from the gripped part 203 to the three-dimensional measurement apparatus 201 is relatively short compared to the distance from the assembly target 204 to the three-dimensional measurement apparatus 201. Therefore, the gripped part 203 reflects a greater amount of light toward the imaging unit 112, and the assembly target 204 reflects a lesser amount of light toward the imaging unit 112 than does the gripped part 203.

If irradiation is performed with the irradiation pattern in this state, the illuminance of the irradiation pattern with which the gripped part 203 is irradiated is relatively high as compared to the illuminance of the irradiation pattern with which the assembly target 204 is irradiated. This gives rise to the possibility that luminance is saturated in a region of the image captured by the imaging unit 112 including the gripped part 203, or luminance is insufficient in a region of the image including the assembly target 204. Especially, in the present case, as the gripped part 203 is a white part and the assembly target 204 is composed of black parts, saturation or insufficiency of luminance easily occurs, and there is a high possibility that the obtained image does not allow for appropriate detection of the irradiation pattern.

In the present embodiment, an image is divided into a gripped part region (first region) including a gripped part and an assembly target region (second region) including an assembly target, or into a high-reflectance region and a low-reflectance region. Then, irradiation is performed with an irradiation pattern that has different optical characteristics, such as brightness and wavelength, depending on the regions. For example, a measurement pattern that has different amounts of irradiation light (irradiation intensities) depending on regions is generated such that an amount of irradiation light in a region of the measurement pattern with which the gripped part 203 is irradiated (a first region) is less than an amount of irradiation light in a region of the measurement pattern with which the assembly target 204 is irradiated (a second region). In this way, a proper image is obtained and the irradiation pattern is detected appropriately for both of the gripped part 203 and the assembly target 204 (measurement targets), thereby allowing distance measurement to be performed simultaneously for the gripped part 203 and the assembly target 204.

Furthermore, according to the present embodiment, locations at which an image is divided and an irradiation pattern can be changed adaptively in accordance with, for example, the shape or the gripped state of the gripped part 203. Therefore, even if a gripped part is changed or the location at which a part is gripped is shifted, accurate distance measurement can be performed simultaneously for the gripped part 203 and the assembly target 204. It goes without saying that the method according to the present embodiment can be used similarly also in a case when the gripped part 203 reflects a lesser amount of light toward the imaging unit 112 than does the assembly target 204.

Figure 3:
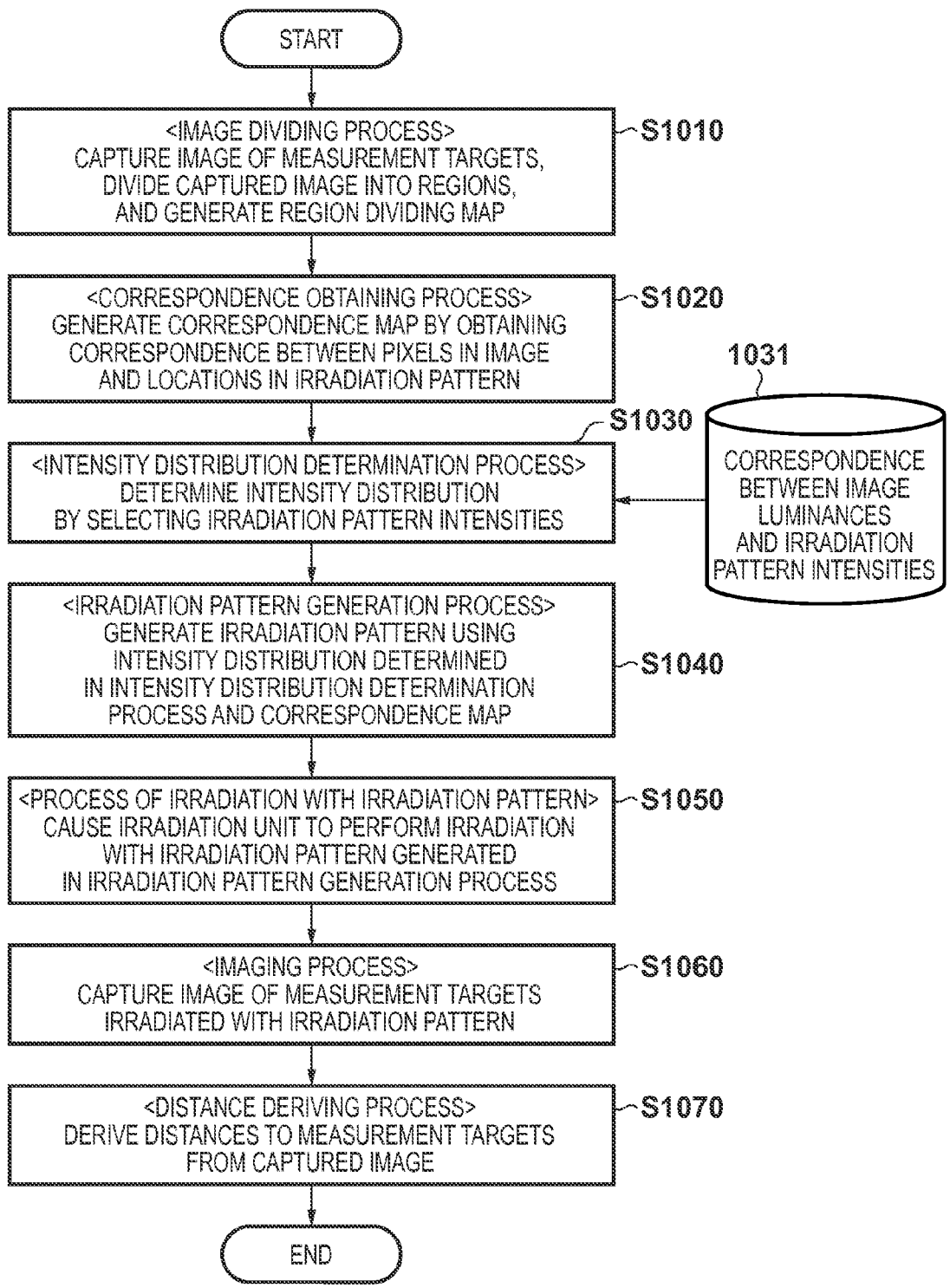
FIG. 3 is a flowchart showing an example of processing according to the first embodiment.

The following describes processing executed by the information processing apparatus 10 with reference to FIG. 3. In the following description, it is assumed that the information processing apparatus 10 controls the assembly system 21 shown in FIG. 2A.

In step S1010, the imaging unit 112 captures an image including measurement targets. Then, the image dividing unit 116 generates a region dividing map by applying a region dividing process to the captured image. More specifically, the image dividing unit 116 extracts a region including the gripped part 203 from the captured image. Based on the result of the extraction, the image dividing unit 116 generates the region dividing map. The region dividing map specifies labels that indicate divided regions to which pixels belong on a per-pixel basis.

A description is now given of a region dividing method implemented by the image dividing unit 116. First, the robotic hand mechanism 131 moves the robotic hand 202 gripping the gripped part 203 in such a manner that, as viewed from the imaging unit 112, the gripped part 203 is located in front of a reference background. Typically, the reference background is a flat background made of a planar material of a uniform reflectance. The reference background is not limited to any particular type, as long as a computer can distinguish between a region including the gripped part 203 and a region including the background in the captured image in a manner described later. For example, the assembly target 204 may be included in the reference background.

Subsequently, the imaging unit 112 obtains a captured image by capturing an image of the robotic hand 202 gripping the gripped part 203 and the gripped part 203 against the reference background. The image dividing unit 116 further obtains, from a storage unit (not shown), a captured image obtained by capturing an image of the robotic hand 202 that is not gripping the gripped part 203 against the reference background. This captured image is captured by the imaging unit 112 in advance. Then, based on a difference between the captured image showing the state where the gripped part 203 is gripped and the captured image showing the state where the gripped part 203 is not gripped, the image dividing unit 116 extracts a region including the gripped part 203 from the captured image showing the state where the gripped part 203 is gripped. An extraction method is not limited to a particular method. For example, the image dividing unit 116 can extract the region including the gripped part 203 by binarizing a difference image based on the two images using a predetermined pixel value as a threshold, and removing noise using a median filter, and the like.

The region including the gripped part 203 thus obtained is referred to as a gripped part region. A region of a captured image that does not include the gripped part 203 is referred to as a background region. Thereafter, the image dividing unit 116 generates a region dividing map in which pixels corresponding to the gripped part region are assigned a label "1", and pixels corresponding to the background region are assigned a label "0". In the present embodiment, the imaging unit 112 is mounted on the robotic hand 202. Therefore, in an image captured by the imaging unit 112, the gripped part 203 is shown in the same location unless the relative locations of the imaging unit 112 and the gripped part 203 are changed as a result of, for example, the robotic hand 202 releasing the gripped part 203 and then gripping the gripped part 203 again. For example, even if the gripped part 203 has been moved by the robotic hand 202 to the vicinity of the assembly target 204, the gripped part 203 is shown in the same location in an image captured by the imaging unit 112.

In step S1020, the correspondence obtaining unit 113 generates a correspondence map in accordance with the correspondence between pixels in the image captured by the imaging unit 112 and the locations in the irradiation pattern. More specifically, first, the irradiation unit 111 performs irradiation with the above-described irradiation pattern that has coded information while the gripped part 203 is located in front of the reference background as viewed from the imaging unit 112. Then, the imaging unit 112 obtains the captured image while the irradiation is performed by the irradiation unit 111. In the present embodiment, the irradiation pattern, irradiation intensities of the irradiation unit 111, the positional relationship between the irradiation unit 111 and the reference background, and the like, are set so as to enable detection of the irradiation pattern with which the reference background is irradiated from the captured image.

Thereafter, with reference to the region dividing map, the correspondence obtaining unit 113 detects the irradiation pattern from the pixels assigned the label "0", that is to say, from the background region. Then, by extracting the coded information from the detected irradiation pattern, it obtains the correspondence between locations in the irradiation pattern indicated by the coded information and locations in the image from which the coded information has been extracted. In the present embodiment, the correspondence obtaining unit 113 generates a correspondence map that indicates, for each location in the irradiation pattern, whether or not a pattern of that location is shown in the gripped part region. This correspondence map indicates, for each location in the irradiation pattern, whether or not the gripped part is irradiated with a pattern of that location.

For example, if the coded information embedded in the irradiation pattern is detected from the background region of the captured image, locations in the correspondence map corresponding to the detected coded information are assigned the label "0". In this way, locations in the irradiation pattern irradiating an object other than the gripped part are recorded in the correspondence map. On the other hand, if the coded information embedded in the irradiation pattern is not detected from the background region of the captured image, locations in the correspondence map corresponding to the coded information are assigned the label "1". In the present embodiment, the reference background and the gripped part are irradiated with the irradiation pattern. Therefore, the gripped part is irradiated with coded information for which correspondence with an image of the background region has not been recognized. In this way, locations in the irradiation pattern with which the gripped part is irradiated are also recorded in the correspondence map. Information indicating the correspondence between the locations in the irradiation pattern indicated by the coded information and the locations in the image from which the coded information has been extracted is not limited to a particular configuration. For example, instead of generating the correspondence map, coordinates of the captured image may be recorded in correspondence with locations in the irradiation pattern.

In step S1030, the intensity distribution determination unit 114 determines the irradiation intensities at which the measurement targets are irradiated. In the present embodiment, the intensity distribution determination unit 114 determines the irradiation intensities for respective regions indicated by the region dividing map. In other words, the intensity distribution determination unit 114 determines the irradiation intensity for the gripped part and the irradiation intensity for objects other than the gripped part. In this way, the irradiation intensity distribution for the measurement targets is determined. A specific process thereof will now be described.

First, the imaging unit 112 captures two images of the robotic hand 202 gripping the gripped part 203 against the reference background. The first image (first captured image) is captured while the irradiation unit 111 is not performing irradiation with light, that is to say, under ambient light. On the other hand, the second image (second captured image) is captured while the irradiation unit 111 is performing irradiation with a uniform irradiation pattern. It should be noted that the irradiation unit 111 is not limited to being in a particular state when capturing the two images, and it is sufficient to capture the two images in such a manner that the light with which the irradiation unit 111 performs irradiation appears different in the two images. For example, the first image may be captured while the irradiation unit 111 is performing irradiation with uniform light across the entire angle of view of the imaging unit 112. Also, the image obtained in step S1010 may be used as the first image.

Next, with reference to the region dividing map, the intensity distribution determination unit 114 derives an average of pixel values of pixels assigned the label "1", that is to say, the gripped part region. In this manner, the intensity distribution determination unit 114 derives the intensity value of the gripped part region under ambient light and the intensity value of the gripped part region under the irradiation pattern. It should be noted that an average value need not be used as the intensity value of the gripped part region, and a statistical value, such as a median value, may be used thereas. Furthermore, while an average pixel value is used as the intensity value in the present embodiment, the intensity value may be derived using other methods.

Then, with reference to pre-generated correspondence 1031 between image luminances and irradiation intensities, the intensity distribution determination unit 114 determines the irradiation intensity corresponding to the intensity value of the gripped part region under ambient light and the intensity value of the gripped part region under irradiation. A lookup table shown in FIG. 4 is an example of the pre-generated correspondence 1031 between the image luminances and the intensities of the irradiation pattern.

FIG. 4 defines the intensity values of the gripped part region under ambient light and the intensity values of the gripped part region under the irradiation pattern, together with the irradiation intensities corresponding thereto. The irradiation intensities defined in FIG. 4 are determined in advance so as to enable distance measurement of a higher accuracy. For example, in a case when the intensity value under ambient light is 85 and the intensity value under the irradiation pattern is 244, the intensity distribution determination unit 114 selects "IRRADIATION PATTERN INTENSITY 1" corresponding thereto as the irradiation intensity for the gripped part region. On the other hand, in a case when the irradiation intensity corresponding to the intensity value under ambient light and the intensity value under the irradiation pattern is not defined, the intensity distribution determination unit 114 determines "IRRADIATION PATTERN INTENSITY D", which is a default value (DEFAULT), as the irradiation intensity for the gripped part region.

A suitable irradiation intensity can be selected in accordance with reflection characteristics, and the like, of the gripped part by thus referring to intensity values of an image obtained under different light conditions, for example, the intensity value obtained under ambient light without performing irradiation with the irradiation pattern, and the intensity value obtained under the irradiation pattern. In addition, the gripped part can be identified more accurately. It should be noted that the intensity distribution determination unit 114 may determine the irradiation intensity in accordance with the intensity value of the gripped part region from one captured image. For example, the irradiation intensity can be determined using the correspondence between intensity values of the gripped part region and irradiation intensities for one captured image. Furthermore, the irradiation intensity corresponding to the intensity value of the gripped part region can also be determined using a predetermined function.

Meanwhile, the intensity distribution determination unit 114 determines "IRRADIATION PATTERN INTENSITY D", which is a default value, as the irradiation intensity for the background region. In the above-described manner, the irradiation intensities are determined for the respective divided regions obtained in step S1010.

The correspondence between the image luminances and the intensities of the irradiation pattern can be generated as appropriate. The following describes an example of a method of generating the same. According to the present method, the imaging unit 112 captures two images, similar to step S1030, while the robotic hand 202 is gripping various parts. Then, the luminances of the two images are recorded in association with the intensity of the irradiation pattern that achieves the most accurate distance measurement. Below is a more detailed description of the present method.

First, the robotic hand 202 and the gripped part 203 are arranged in conformity with the locations and orientations in the actual assembly operation. For example, the robotic hand 202 is operated such that the robotic hand 202 grips the gripped part 203 in a manner similar to the actual assembly operation. The arrangement operation may be performed manually, or may be performed by operating the robotic hand 202.

Next, the robotic hand 202 is moved so that the imaging unit 112 can capture images of the gripped part 203 against the reference background. Then, the imaging unit 112 obtains two images under light conditions similar to those used in step S1030, for example, under ambient light and a uniform irradiation pattern. From each of these two images, the gripped part region is extracted and the intensity value of the region is derived. The gripped part region can be extracted in a manner similar to step S1010. The intensity value of the region can be derived in a manner similar to step S1030. By performing the image capture and deriving the intensity values repeatedly for one gripped part 203, the range of intensity values of the gripped part region under ambient light and the range of intensity values of the gripped part region under a uniform irradiation pattern can be determined.

Thereafter, while maintaining the state where the imaging unit 112 can capture images of the gripped part 203 against the reference background, the irradiation unit 111 performs irradiation with the irradiation pattern, and at the same time, the imaging unit 112 performs the image capture. Furthermore, by using the captured images, the distance deriving unit 121 derives a distance to the gripped part 203, more precisely, the location of the gripped part 203 relative to the irradiation unit 111 and the imaging unit 112. The irradiation pattern used here can be a uniform pattern. At this time, the irradiation unit 111 performs irradiation with irradiation patterns of various intensities, and the distance deriving unit 121 derives distances under the respective irradiation patterns. More specifically, the distances can be derived while gradually decreasing the irradiation intensity, starting from the maximum irradiation intensity. Then, the distance deriving unit 121 determines the intensity of the irradiation pattern with which the distance can be derived with the highest accuracy (for example, with the smallest error), and records the determined intensity.

The accuracy of derivation of a distance can be determined using the actual distance information. For example, the distance to the gripped part 203 can be estimated through a simulation using three-dimensional models of the robotic hand 202, the imaging unit 112, the irradiation unit 111, and the gripped part 203. The accuracy of derivation can be determined in accordance with error between the distance estimated through the simulation and the distance derived by the distance deriving unit 121. There is error between the distance of the simulation and the actual distance. The error in the distance of the simulation, however, is tolerable, because the present example merely makes a determination about whether or not the distance can be measured with high accuracy using a predetermined irradiation intensity.

The correspondence shown in FIG. 4 can be obtained by performing the above-described operation for a plurality of gripped parts 203. In FIG. 4, except for the row numbered 1, different rows correspond to different gripped parts 203. The range of intensity values of the gripped part region under ambient light, the range of intensity values of the gripped part region under a uniform irradiation pattern, and the intensity of the irradiation pattern with which the distance can be derived with the highest accuracy are recorded for each of the gripped parts 203. It is also possible to discriminate a part that is currently being gripped using the correspondence of FIG. 4 in step S1030. It is permissible to determine the irradiation intensity for each one of different locations and orientations of one gripped part 203.

In the row numbered 1, a default irradiation pattern intensity D is recorded. Parts that do not fall within any of the intensity value ranges defined in other rows are irradiated with an irradiation pattern of the intensity D. Also, any object other than the gripped part is irradiated with an irradiation pattern of the intensity D. This intensity D can be set as appropriate. For example, with respect to the assembly target 204, too, it is permissible to similarly determine the intensity of an irradiation pattern with which the distance can be derived with the highest accuracy, and use the determined intensity as the intensity D.

In step S1040, the irradiation pattern generation unit 115 determines an irradiation pattern in accordance with the irradiation intensities determined in step S1030 and the correspondence map obtained in step S1020. More specifically, the irradiation pattern generation unit 115 generates the irradiation pattern such that the measurement targets of the divided regions of a captured image are irradiated with the irradiation pattern of the corresponding intensities determined in step S1030. Below is a detailed description of this process.

For each location in the irradiation pattern, whether or not a pattern of that location is shown in the gripped part region, that is to say, whether or not the gripped part is irradiated with a pattern of that location, is recorded in the correspondence map. Furthermore, in step S1030, the irradiation intensities are determined for the respective divided regions, that is to say, for the respective labels "0" and "1" of the region dividing map. Therefore, for each location in the irradiation pattern, the irradiation pattern generation unit 115 selects a divided region that shows a pattern of that location, and sets the irradiation intensity corresponding to the selected divided region as the irradiation intensity of that location in the irradiation pattern. In this manner, the irradiation pattern generation unit 115 can generate the irradiation pattern that has irradiation intensities set for the respective locations.

In step S1050, an instruction unit (not shown) included in the information processing apparatus 10 instructs the irradiation unit 111 to irradiate the measurement targets with the irradiation pattern generated in step S1040. In step S1060, the imaging unit 112 captures an image of the measurement targets irradiated with the irradiation pattern. In step S1070, the distance deriving unit 121 derives distances to the measurement targets with reference to the image captured in step S1060 and the irradiation pattern with which the irradiation was performed.

A description is now given of an overall operation of the assembly apparatus 13. First, the irradiation unit 111 performs irradiation with an irradiation pattern generated by the irradiation pattern generation unit 115. The irradiation pattern generation unit 115 can generate the irradiation pattern at an arbitrary timing. For example, the irradiation pattern may be generated each time the distances to the measurement targets are derived. Also, the irradiation pattern may be generated when the robotic hand 202 grips a new gripped part 203. Furthermore, the irradiation pattern may be generated when the gripped part 203 approaches the assembly target 204.

Next, the imaging unit 112 captures an image of the measurement targets irradiated with the irradiation pattern. Then, based on the captured image obtained, the distance deriving unit 121 derives the distances to the measurement targets. As described above, the distance deriving unit 121 derives the distances using the irradiation pattern and the locations in the captured image corresponding to the irradiation pattern. In addition, internal parameters of the irradiation unit 111 and the imaging unit 112, as well as information indicating the relative locations and orientations of the robotic hand 202 and the measurement targets, may also be used. Then, the distance deriving unit 121 transmits the obtained distance information to the robotic hand mechanism 131, and the robotic hand mechanism 131 performs operational control, such as feedback control, using the transmitted information.

As another embodiment, the irradiation pattern generation unit 115 may compare a captured image that was previously used in determining the irradiation intensities with an image that was captured in the current process, and if the difference therebetween is small, generate an irradiation pattern using the irradiation intensities that were previously used. For example, a sum total of values of per-pixel differences between the image that was previously captured and the image that was captured in the current process may be derived, and the derived sum total may be compared with a predetermined threshold. If the sum total of values of differences is less than the predetermined threshold, the difference between the captured images can be determined to be small. As still another embodiment, if the sum total of values of differences is less than the predetermined threshold, the intensity distribution determination unit 114 can also adjust the irradiation intensities that were previously obtained in accordance with the values of differences, and use the resultant intensities as the irradiation intensities in the current process. More specifically, if the image has become brighter, the irradiation intensities may be decreased. Moreover, the irradiation pattern generation unit 115 may compare a captured image that was previously used in determining the irradiation pattern with an image that was captured in the current process, and generate a new irradiation pattern only if the difference therebetween is large.

In the present embodiment, distances to an assembly target and a gripped part can be obtained, simultaneously and with higher accuracy, using irradiation light that is configured to have different irradiation intensities depending on divided regions, and, therefore, accurate assembly is facilitated. In the present embodiment, the irradiation intensities are determined in accordance with the intensity values of a captured image. Alternatively, the irradiation intensities may be determined on a per-color component basis. For example, in FIG. 4, intensities for respective colors R, G, and B may be set as irradiation intensities. Furthermore, corresponding irradiation intensities may be set for respective combinations of intensity values of the colors R, G, and B. Moreover, irradiation intensities may be set for the respective colors R, G, and B in accordance with the intensity values. Assume an exemplary case wherein the assembly target 204 reflects a lesser amount of light of a predetermined color component, e.g., an R component (focused color component), toward the imaging unit 112 than the gripped part 203 does. In this case, the amount of irradiation light for the R component can be set such that the gripped part 203 is irradiated with a lesser amount of irradiation light for the R component than is the assembly target 204.

Second Embodiment

The following describes a second embodiment of the present invention. The second embodiment differs from the first embodiment in that the intensity of an irradiation pattern with which an assembly target is irradiated is changed in accordance with the distance between the assembly target 204 and the three-dimensional measurement apparatus 201. According to the present embodiment, irradiation can be performed with appropriate irradiation light even if the distance between the assembly target 204 and the three-dimensional measurement apparatus 201 is changed. As the distance between the gripped part 203 and the three-dimensional measurement apparatus 201 does not change, the intensity of irradiation light toward the gripped part 203 is determined in a manner similar to that in the first embodiment.

In the present embodiment, information indicating the pre-generated correspondence between the luminances of an image captured by the imaging unit 112 and the attributes of the measurement targets is used. It should be noted that an attribute is information for identifying one measurement target from among a plurality of measurement targets. For example, this attribute can be information for identifying a gripped part 203 that is currently being gripped. The attribute is not limited to a particular attribute as long as it allows for identification of a measurement target. More specifically, the attribute can be the name of a part, the name of material, and the like.

The following describes a flow of processing according to the second embodiment. Apparatuses and processing methods according to the present embodiment are similar to those according to the first embodiment, and a description of similar configurations will be omitted. The processing according to the present embodiment differs from the processing according to the first embodiment in the process of step S1030. First, a description is given of correspondence information used in step S1030. In the present embodiment, irradiation intensities are determined using correspondence information shown in FIGS. 5A and 5B instead of the correspondence information shown in FIG. 4. Similar to the first embodiment, the information shown in FIGS. 5A and 5B is generated in advance.

A method of generating the information shown in FIGS. 5A and 5B will now be described. In the present embodiment, information indicating the correspondence between luminances and attributes shown in FIG. 5A, as well as information indicating the correspondence between attributes and intensities shown in FIG. 5B, is used. The information shown in FIG. 5A is similar to the information shown in FIG. 4, but includes attribute information, instead of irradiation intensities, in correspondence with combinations of intensity values. This attribute information is information for identifying gripped parts corresponding to respective combinations of intensity values (gripped parts 1 to 3). The attribute "ASSEMBLY UNIT" is set as default attribute information.

FIG. 5B shows the correspondence between attributes and intensities. For the attributes "GRIPPED PART 1" to "GRIPPED PART 3", constant irradiation intensities (irradiation pattern intensities 1 to 3) are used, regardless of the distance between the assembly target 204 and the three-dimensional measurement apparatus 201. This is because the distance between the three-dimensional measurement apparatus 201 and the gripped part 203 is substantially constant. These irradiation pattern intensities 1 to 3 are similar to the irradiation pattern intensities 1 to 3 shown in FIG. 4, and are determined in a manner similar to the first embodiment. On the other hand, for the attribute "ASSEMBLY UNIT", different intensities (irradiation pattern intensities 4 to 6) are set depending on the distance between the assembly target 204 and the three-dimensional measurement apparatus 201.

A method of determining the irradiation intensities for "ASSEMBLY UNIT" will now be described. First, similar to the first embodiment, the robotic hand 202 and the assembly target 204 are arranged in accordance with the actual assembly operation. In this state, the distance deriving unit 121 derives distances to the assembly target 204 using an image that is captured by the imaging unit 112 while the irradiation unit 111 is performing irradiation with an irradiation pattern. Similar to the first embodiment, the distance deriving unit 121 derives distances while gradually decreasing the irradiation intensity, starting from the maximum irradiation intensity. Then, the distance deriving unit 121 determines the intensity of the irradiation pattern with which the distance can be derived with the highest accuracy, and records the determined intensity. The accuracy of derivation of a distance can also be determined in a manner similar to that in the first embodiment. The intensities of the irradiation pattern are determined in the above-described manner while changing the distance between the three-dimensional measurement apparatus 201 and the assembly target 204. As a result, the irradiation pattern intensities 4 to 6 corresponding to the respective distances are determined.

Below is a description of the process of step S1030 according to the present embodiment. Similar to the first embodiment, the intensity distribution determination unit 114 captures two images of the robotic hand 202 gripping the gripped part 203 against the reference background. Then, similar to the first embodiment, the intensity distribution determination unit 114 derives the intensity value of the gripped part region under ambient light and the intensity value of the gripped part region under the irradiation pattern. An attribute corresponding to this combination of intensity values is selected in accordance with FIG. 5A, and an irradiation intensity corresponding to the selected attribute is selected in accordance with FIG. 5B. In this manner, the attribute of the gripped part is detected, and the irradiation intensity for the gripped part region is determined. If the intensity values do not correspond to any of the gripped parts 1 to 3, "ASSEMBLY UNIT" may be selected as the attribute, or a default attribute, which is not shown, may be selected.

On the other hand, for a region that does not include the gripped part, an irradiation intensity corresponding to a relative distance between the irradiation unit 111 and the assembly target 204 is selected with reference to FIG. 5B, instead of the irradiation pattern intensity D. For example, if the relative distance is 75 mm, "IRRADIATION PATTERN INTENSITY 5" is selected as the irradiation intensity. The relative distance between the irradiation unit 111 and the assembly target 204 can be derived with reference to location/orientation information of the robotic hand 202 and arrangement information of the assembly target 204. The location/orientation information of the robotic hand 202 can be obtained from the control apparatus for the robotic hand 202. It is sufficient to input the arrangement information of the assembly target 204 in advance.

As another method, if the timing for performing irradiation with the irradiation pattern is known in advance, it is permissible to measure a relative distance at that timing and to input the measured relative distance in advance. Furthermore, it is also permissible to use, as a relative distance, a distance derived by the distance deriving unit 121 using an image that is captured by the imaging unit 112 while irradiation is performed with an irradiation pattern of a predetermined intensity. The above methods allow a distance obtaining unit (not shown) to obtain a relative distance between the irradiation unit 111 and the assembly target 204.

The irradiation pattern generation unit 115 generates an irradiation pattern using the irradiation intensities determined in the above-described manner, that is to say, the irradiation intensity for the gripped part region and the irradiation intensity for a region that includes the assembly target 204, but does not include the gripped part. While the irradiation intensity corresponding to the distance between the irradiation unit 111 and the assembly target 204 is selected with reference to FIG. 5B in the present embodiment, the irradiation intensity corresponding to this distance may be derived using a predetermined function.

Third Embodiment

The following describes a third embodiment of the present invention. In the third embodiment, the intensity distribution determination unit 114 determines irradiation intensities using design information of measurement targets and relative location/orientation information of the three-dimensional measurement apparatus 201 and the measurement targets. A flow of processing according to the third embodiment will now be described. Apparatuses and processing methods according to the present embodiment are similar to those according to the first embodiment, and a description of similar configurations will be omitted. The processing according to the present embodiment differs from the processing according to the first embodiment in the process of step S1030 and the addition of step S1035 between steps S1030 and S1040.

In step S1030, the intensity distribution determination unit 114 determines the irradiation intensities using relative location/orientation information of the three-dimensional measurement apparatus 201 and the measurement targets. More specifically, first, the intensity distribution determination unit 114 reproduces a three-dimensional model simulating the assembly by the robotic hand 202 in three-dimensional space using graphics hardware. Precisely, the irradiation unit 111, the imaging unit 112, and the measurement targets are drawn in three-dimensional space. At this time, a light source of the irradiation unit 111 and location information of a projection surface, which is held by the imaging unit 112, are referenced. This relative location/orientation information can be derived using, for example, information indicating the location and orientation of the robotic hand 202.

Then, the intensity distribution determination unit 114 determines the irradiation intensities in accordance with location/orientation information indicating the locations and orientations of the irradiation unit 111, the imaging unit 112, and the measurement targets, as well as the design information of the measurement targets. This design information is, for example, information indicating the optical reflectances of the measurement targets and prepared in advance. This information indicating the optical reflectances may be information indicating the reflectances or the spectral reflection characteristics with respect to predetermined light. The intensity distribution determination unit 114 can derive the irradiation intensities corresponding to the locations of the measurement targets and the reflectances or the spectral reflection characteristics of the measurement targets using a function. For example, the irradiation intensities can be increased in any of the following cases: relative distances between the irradiation unit 111 or the imaging unit 112 and the measurement targets are long; the reflectances of the measurement targets are low; and the measurement targets are close to black. On the other hand, light amounts can be decreased in opposite cases. In this manner, the irradiation intensities can be determined such that the irradiation intensities for an image captured by the imaging unit 112 fall within a predetermined range.

In the above-described manner, for each location in an irradiation pattern, the intensity distribution determination unit 114 determines the irradiation intensity in accordance with design information of a measurement target irradiated with an irradiation pattern of that location. On the other hand, the intensity distribution determination unit 114 may determine the irradiation pattern intensities for a location irradiating the gripped part and for a location irradiating an object other than the gripped part. In this case, the irradiation pattern generation unit 115 can generate the irradiation pattern using the irradiation intensities thus determined in a manner similar to step S1040 according to the first embodiment.

The intensity distribution determination unit 114 may further adjust the irradiation intensities through a simulation. More specifically, the intensity distribution determination unit 114 estimates, through a simulation, the amounts of light that reach the imaging unit 112, which light is irradiated by the irradiation unit 111, and is reflected at the measurement targets toward the imaging unit 112. That is to say, the intensity distribution determination unit 114 reproduces an image that is captured by the imaging unit 112 when the irradiation unit 111 performs irradiation with the irradiation pattern through a simulation in three-dimensional space. This simulation can be conducted using, for example, information of the locations and orientations of models of the irradiation unit 111, the imaging unit 112 and the measurement targets, a light amount of the light source, and the reflectances or the spectral reflection characteristics of the measurement targets. By using these pieces of information, the intensity distribution determination unit 114 derives intensity values of an image captured by the imaging unit 112 through the simulation.

If an irradiation pattern that falls within a desired luminance range is included in measurement target portions of an image obtained through the simulation, processing proceeds to step S1035, and the irradiation intensities are determined using an irradiation pattern with which the irradiation unit 111 was performing irradiation at that time. On the other hand, if an irradiation pattern that falls within a desired luminance range is not included, the intensity distribution determination unit 114 changes the irradiation intensities and conducts a simulation again. More specifically, a simulation can be conducted again using a plurality of irradiation patterns that are different from the previous irradiation pattern. For example, a simulation can be conducted using patterns whose intensities are higher or lower by a predetermined value than the intensities of the previous irradiation pattern. As another method, a simulation may be conducted again after changing a parameter of a function used in the simulation. By repeating the simulation, the irradiation pattern intensities are determined such that an irradiation pattern that falls within a desired luminance range is included in measurement target portions of an image obtained through the simulation. In step S1035, the irradiation intensities are determined using the irradiation pattern thus obtained.

In step S1035, the intensity distribution determination unit 114 determines the irradiation intensities for the respective divided regions. In the present embodiment, the irradiation pattern determined in step S1030 is the intensity distribution of the irradiation pattern derived through the simulation. In many cases, this intensity distribution does not exactly match the distribution of the regions shown in the divided region map generated in step S1010. Therefore, in the present embodiment, the intensity distribution determination unit 114 determines the irradiation intensities for the respective regions with reference to the correspondence map obtained in step S1020 and the irradiation pattern determined in step S1030. In this way, the intensity distribution determination unit 114 finely adjusts the irradiation pattern such that the irradiation is performed with the irradiation pattern of the intensities determined in step S1030 in accordance with the divided region map generated in step S1010.

More specifically, with reference to the correspondence map obtained in step S1020, the intensity distribution determination unit 114 determines, for each pixel shown in the divided region map, the irradiation intensity of a corresponding location in the irradiation pattern determined in step S1030. In this manner, the intensity distribution determination unit 114 determines the irradiation intensity for each divided region by summing a plurality of irradiation intensities corresponding to a plurality of pixels included in that divided region. More specifically, the intensity distribution determination unit 114 can use a statistical value, e.g., a mode of the plurality of irradiation intensities as the irradiation intensity for that divided region. In this manner, the intensity distribution determination unit 114 determines the irradiation intensities for the respective regions. By using the irradiation intensities thus determined, an irradiation pattern is generated in step S1040 in a manner similar to that in the first embodiment.

Fourth Embodiment

Figure 6:
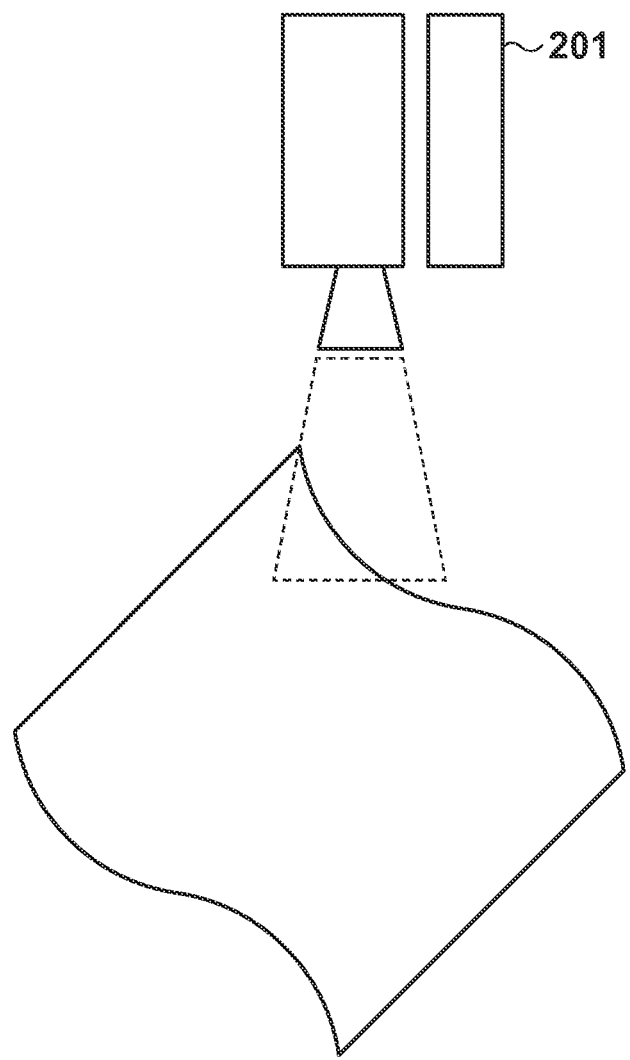
FIG. 6 shows an example of a measurement target for which a distance can be measured in accordance with a fourth embodiment.

The following describes a fourth embodiment of the present invention. In the present embodiment, an irradiation pattern that is more suited for distance measurement can be generated, even in a case when a measurement target has a patterned surface, or in a case when a measurement target has a complicated three-dimensional shape, as shown in FIG. 6. Apparatus configurations according to the present embodiment are similar to those according to the first embodiment. Below, a description of configurations that are similar to those according to the first embodiment will be omitted.

The following describes an example of processing according to the present embodiment, with reference to a flowchart of FIG. 7. In step S4010, the imaging unit 112 captures an image including measurement targets. Then, similar to the first embodiment, the image dividing unit 116 generates a region dividing map by applying a region dividing process to the captured image. In step S4020, similar to the first embodiment, the correspondence obtaining unit 113 obtains a correspondence map showing the correspondence between pixels in the image and the locations in an irradiation pattern.

In step S4030, the intensity distribution determination unit 114 and the irradiation pattern generation unit 115 determine the irradiation intensities. A description is now given of this process, with reference to a flowchart of FIG. 8. In step S4031, the imaging unit 112 captures an image of the measurement targets that are irradiated with irradiation pattern light (preliminary measurement pattern) by the irradiation unit 111, and an image of the measurement targets under ambient light without the irradiation unit performing irradiation with light. The irradiation pattern light with which irradiation is performed in step S4031 is not limited to particular irradiation pattern light, and can be, for example, uniform irradiation pattern light. That is to say, the irradiation intensity for the gripped part and the irradiation intensity for an object other than the gripped part may be the same. The irradiation pattern light is not limited to particular intensities, as long as the irradiation unit 111 can perform irradiation with the irradiation pattern light.

In step S4032, the irradiation pattern generation unit 115 detects, from the image of the measurement targets irradiated with the irradiation pattern light by the irradiation unit 111, a region with a large amount of reflected light (first region) and a region with a small amount of reflected light (second region). In the present embodiment, the irradiation pattern generation unit 115 detects these regions by further referring to the image of the measurement targets that was captured under ambient light without the irradiation unit performing irradiation with light. More specifically, the irradiation pattern generation unit 115 generates a difference image based on the two images obtained in step S4031.

In step S4033, the irradiation pattern generation unit 115 determines whether or not pixel values of respective pixels in the difference image fall within a predetermined range. More specifically, the irradiation pattern generation unit 115 determines whether or not the pixel values are equal to or less than an upper limit threshold, and whether or not the pixel values are equal to or greater than a lower limit threshold. These thresholds specify a desired range of luminance differences of the difference image, and are determined in advance. If the pixel values of all pixels fall within the predetermined range, the process of step S4030 is ended. In this case, the irradiation pattern with which irradiation was performed in the most recent step S4031 or S4035 is used for irradiation in step S4040. On the other hand, if any of the pixel values of the pixels does not fall within the predetermined range, processing proceeds to step S4034.

In step S4034, based on the result of comparison in step S4033, the intensity distribution determination unit 114 corrects the irradiation intensities of the irradiation pattern with which irradiation was performed in the most recent step S4031 or S4035. More specifically, if any pixel value of a gripped part region of the difference image is greater than the upper limit threshold, the irradiation pattern generation unit 115 decreases the irradiation intensity for the gripped part by a predetermined amount. On the other hand, if any pixel value of the gripped part region of the difference image is less than the lower limit threshold, the irradiation pattern generation unit 115 increases the irradiation intensity for the gripped part by a predetermined amount. The irradiation pattern generation unit 115 similarly corrects the irradiation intensity for a region other than the gripped part region with reference to pixel values of the difference image corresponding to a background region.

Furthermore, similar to the first embodiment, the irradiation pattern generation unit 115 generates an irradiation pattern in accordance with the irradiation intensities corrected by the intensity distribution determination unit 114. Similar to the first embodiment, this process can be executed in accordance with the correspondence map obtained in step S4010.

In step S4035, the irradiation unit 111 irradiates the measurement targets with the irradiation pattern generated in step S4034. Then, the imaging unit 112 captures an image of the measurement targets irradiated with the irradiation pattern. Thereafter, processing returns to step S4032, and similar processing is repeated using an image of the measurement targets that was captured under ambient light without the irradiation unit performing irradiation with light, and the image that was captured in step S4036. The irradiation pattern is generated through the above-described processing.

With regard to a certain location in the irradiation pattern, there is a case when the corresponding pixel value is determined to exceed the upper limit threshold in the $N^{th}$ step S4033 and fall below the lower limit threshold in the $(N+1)^{th}$ step S4033, and vice versa. In this case, in the subsequent step S4034, the irradiation intensities can be multiplied by a predetermined coefficient, instead of being increased or decreased by a predetermined amount. As another method, intermediate intensities between the irradiation intensities in the Nth process and the irradiation intensities in the (N+1)th process may be used as new irradiation intensities. With these methods, the irradiation intensities can be determined such that pixel values of the difference image fall between the two thresholds whenever possible.

In steps S4040 to S4060, processes similar to steps S1050 to S1070 according to the first embodiment are executed. Through the above-described processing, an irradiation pattern suited for distance measurement can be generated with reference to an image of measurement targets.

Modification Example of Fourth Embodiment

In the fourth embodiment, an irradiation pattern is generated while correcting the irradiation intensity for a gripped part and the irradiation intensity for an object other than the gripped part. In the present modification example, an irradiation pattern is generated while correcting the irradiation intensities for respective locations in the irradiation pattern on an individual basis. An apparatus according to the present modification example need not include the intensity distribution determination unit 114 and the image dividing unit 116. Furthermore, step S4010 can be omitted. The following describes differences from the fourth embodiment.

In step S4020, the correspondence obtaining unit 113 obtains a correspondence map. The correspondence map according to the present modification example specifies, for each location in the irradiation pattern with which the irradiation unit 111 performs irradiation, a pixel in a captured image showing an irradiation pattern of that location. For example, the correspondence map can be information that specifies, for each coded information of the irradiation pattern, a pixel in a captured image showing that coded information. As this correspondence map is used in control for the irradiation pattern and is not used directly in deriving distances to measurement targets, detection error attributed to excessively high irradiation intensities is tolerable.

In step S4033, the irradiation pattern generation unit 115 determines whether or not pixel values of pixels in a difference image corresponding to the respective locations in the irradiation pattern fall within a predetermined range. This determination can be made in accordance with the correspondence map obtained in step S4020. If all of the pixel values corresponding to the locations in the irradiation pattern fall within the predetermined range, the process of step S4030 is ended. On the other hand, if any of the pixel values corresponding to the locations in the irradiation pattern does not fall within the predetermined range, processing proceeds to step S4034.

In step S4034, based on the result of comparison in step S4033, the irradiation pattern generation unit 115 corrects the irradiation intensities of the respective locations in the irradiation pattern with which irradiation was performed in the most recent step S4031 or S4035. More specifically, if corresponding pixel values of the difference image are greater than an upper limit threshold, the irradiation intensities are decreased by a predetermined amount. On the other hand, if corresponding pixel values of the difference image are less than a lower limit threshold, the irradiation intensities are increased by a predetermined amount.

Through the above processing, an irradiation pattern suited for distance measurement can be generated while controlling the irradiation intensities of respective locations in the irradiation pattern in detail.

Other Embodiments

Embodiments of the present invention can also be realized by a computer of a system or an apparatus that reads out and executes computer executable instructions recorded on a storage medium (e.g., a non-transitory computer-readable storage medium) to perform the functions of one or more of the above-described embodiment(s) of the present invention, and by a method performed by the computer of the system or apparatus by, for example, reading out and executing the computer executable instructions from the storage medium to perform the functions of one or more of the above-described embodiment(s). The computer may comprise one or more of a central processing unit (CPU), a micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), a digital versatile disc (DVD), or a Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

What is claimed is:

1. An information processing apparatus comprising:
    at least one processor operatively coupled to a memory, serving as:
    (i) an irradiation unit configured to irradiate a measurement target with a measurement pattern for distance measurement;
    (ii) an imaging unit configured to obtain a captured image including the measurement target irradiated with the measurement pattern;
    (iii) a first detection unit configured to detect a first region and a second region from the captured image obtained by the imaging unit, the first region including a first portion of the measurement target that reflects a greater amount of light toward the imaging unit, and the second region including a second portion of the measurement target that reflects a lesser amount of light toward the imaging unit than does the first portion;
    (iv) a second detection unit that detects, from the measurement pattern, a first region with which the first portion is irradiated and a second region with which the second portion is irradiated;
    (v) a generation unit configured to generate a measurement pattern that has different amounts of irradiation light depending on regions, such that an amount of irradiation light in the first region is less than an amount of irradiation light in the second region;
    (vi) an instruction unit configured to cause the irradiation unit to perform irradiation with the generated measurement pattern; and
    (vii) a deriving unit configured to obtain, from the imaging unit, a captured image including the measurement target irradiated with the generated measurement pattern, and to derive a distance to the measurement target using the obtained captured image,
    wherein the first detection unit is further configured to detect the first region and the second region from a captured image including the measurement target irradiated with a preliminary measurement pattern, and wherein the generation unit is further configured to generate the measurement pattern by correcting the preliminary measurement pattern so as to realize at least one of (i) a decrease in an amount of irradiation light in a region with which the first portion is irradiated, and (ii) an increase in an amount of irradiation light in a region with which the second portion is irradiated.

2. The information processing apparatus according to claim 1, wherein the measurement pattern has coded information, and the second detection unit is further configured to detect the first region and the second region of the measurement pattern based on a captured image including the measurement pattern used in irradiation, on the coded information of the measurement pattern, and on the first region and the second region of the captured image detected by the first detection unit.

3. The information processing apparatus according to claim 1, wherein the first detection unit is further configured to detect one of the first region and the second region based on a luminance distribution of the captured image.

4. The information processing apparatus according to claim 1, wherein the first detection unit is further configured to detect one of the first region and the second region of the captured image by comparing a captured image that is obtained from the imaging unit and includes the first portion or the second portion, with a captured image that is obtained from the imaging unit and does not include the first portion or the second portion.

5. The information processing apparatus according to claim 1, wherein the generation unit is further configured to determine an amount of irradiation light of a region with which at least one of the first portion and the second portion is irradiated, in accordance with pixel values of pixels included in a region of a captured image obtained from the imaging unit corresponding to the at least one of the first portion and the second portion.

6. The information processing apparatus according to claim 5, wherein the generation unit is further configured to derive a statistical value of pixel values of pixels included in a region corresponding to the at least one of the first portion and the second portion, and to obtain an amount of irradiation light corresponding to the derived statistical value as the amount of irradiation light of the region with which the at least one of the first portion and the second portion is irradiated with reference to a lookup table.

7. The information processing apparatus according to claim 6, wherein the generation unit is further configured to obtain, with reference to the lookup table, an amount of irradiation light corresponding to a statistical value of pixel values derived using a first captured image and to a statistical value of pixel values derived using a second captured image that differs from the first captured image in a light condition of the measurement target.

8. The information processing apparatus according to claim 5, wherein the generation unit is further configured to detect an attribute of at least one of the first portion and the second portion in accordance with pixel values of pixels included in a region of a captured image obtained from the imaging unit corresponding to the at least one of the first portion and the second portion, and to obtain an amount of irradiation light corresponding to the detected attribute with reference to a lookup table.

9. The information processing apparatus according to claim 8, wherein the attribute is one of (i) information for identifying an object corresponding to the at least one of the first portion and the second portion, and (ii) information for identifying material of the at least one of the first portion and the second portion.

10. The information processing apparatus according to claim 6, wherein the generation unit is further configured to derive statistical values for respective color components with respect to at least one of the first portion and the second portion, and to obtain amounts of irradiation light corresponding to the statistical values for the respective color components with reference to the lookup table.

11. The information processing apparatus according to claim 1, further comprising a distance obtaining unit configured to obtain a distance to at least one of the first portion and the second portion, wherein the generation unit is further configured to determine an amount of irradiation light of a region with which the at least one of the first portion and the second portion is irradiated in accordance with the distance to the at least one of the first portion and the second portion.

12. The information processing apparatus according to claim 1, wherein the generation unit is further configured to determine an amount of irradiation light in accordance with location/orientation information of the irradiation unit, the imaging unit, and the measurement target, as well as information indicating an optical reflectance of the measurement target.

13. The information processing apparatus according to claim 12, wherein the generation unit is further configured to estimate an amount of light that reaches the imaging unit, wherein the light is irradiated by the irradiation unit and reflected at the measurement target, and to determine the amount of irradiation light in accordance with the estimation.

14. The information processing apparatus according to claim 1, wherein
an amount of irradiation light differs depending on color components,
with respect to focused color components, the second portion reflects a lesser amount of light toward the imaging unit than does the first portion, and
an amount of irradiation light of the focused color components is less in a region of the measurement pattern with which the first portion is irradiated than in a region of the measurement pattern with which the second portion is irradiated.

15. The information processing apparatus according to claim 1, wherein the measurement pattern is a stripe pattern used in a spatial coding method.

16. The information processing apparatus according to claim 1, wherein the first portion and the second portion belong to different parts, and a distance between the imaging unit and the first portion is shorter than a distance between the imaging unit and the second portion.

17. The information processing apparatus according to claim 1, wherein the first portion belongs to a first part and the second portion belongs to a second part different from the first part, the first part is gripped by a gripping unit, and the first part is attachable to the second part.

18. An information processing method comprising:
irradiating a measurement target with a measurement pattern for distance measurement;
obtaining a captured image including the measurement target irradiated with the measurement pattern;
detecting a first region and a second region from the captured image, the first region including a first portion of the measurement target that reflects a greater amount of light, and the second region including a second portion of the measurement target that reflects a lesser amount of light than does the first portion;

detecting, from the measurement pattern, a first region with which the first portion is irradiated and a second region with which the second portion is irradiated;

generating a measurement pattern that has different amounts of irradiation light depending on regions, such that an amount of irradiation light in the first region is less than an amount of irradiation light in the second region;

irradiating a measurement target with the generated measurement pattern;

obtaining a captured image including the measurement target irradiated with the generated measurement pattern; and deriving a distance to the measurement target using the obtained captured image, wherein the first region and the second region are detected from a captured image including the measurement target irradiated with a preliminary measurement pattern, and wherein the measurement pattern is generated by correcting the preliminary measurement pattern so as to realize at least one of (i) a decrease in an amount of irradiation light in a region with which the first portion is irradiated, and (ii) an increase in an amount of irradiation light in a region with which the second portion is irradiated.

19. A non-transitory computer-readable medium storing a program to cause a computer:

to instruct an irradiation unit to irradiate a measurement target with a measurement pattern for distance measurement;

to obtain a captured image including the measurement target irradiated with the measurement pattern;

to detect a first region and a second region from the captured image, the first region including a first portion of the measurement target that reflects a greater amount of light, and the second region including a second portion of the measurement target that reflects a lesser amount of light than does the first portion;

to detect, from the measurement pattern, a first region with which the first portion is irradiated and a second region with which the second portion is irradiated;

to generate a measurement pattern that has different amounts of irradiation light depending on regions, such that an amount of irradiation light in the first region is less than an amount of irradiation light in the second region;

to instruct the irradiation unit to irradiate a measurement target with the generated measurement pattern;

to obtain a captured image including the measurement target irradiated with the generated measurement pattern; and to derive a distance to the measurement target using the obtained captured image, wherein the first region and the second region are detected from a captured image including the measurement target irradiated with a preliminary measurement pattern, and wherein the measurement pattern is generated by correcting the preliminary measurement pattern so as to realize at least one of (i) a decrease in an amount of irradiation light in a region with which the first portion is irradiated, and (ii) an increase in an amount of irradiation light in a region with which the second portion is irradiated.

\* \* \* \* \*